United States Patent [19]
Maloney et al.

[11] 4,443,357
[45] Apr. 17, 1984

[54] HYDROPHOBIC SILICA OR SILICATE, COMPOSITIONS CONTAINING THE SAME AND METHODS FOR MAKING AND USING THE SAME

[75] Inventors: James E. Maloney, Eagan; Thomas R. Oakes, Stillwater, both of Minn.

[73] Assignee: Economics Laboratory, Inc., St. Paul, Minn.

[21] Appl. No.: 224,149

[22] Filed: Jan. 12, 1981

[51] Int. Cl.³ .......................... B01D 19/04; C09C 3/08
[52] U.S. Cl. ................................ 252/321; 106/308 Q; 252/358; 162/158
[58] Field of Search ............................... 252/321, 358; 106/288 B, 308 Q; 162/158

[56] References Cited

U.S. PATENT DOCUMENTS

| 3,304,266 | 2/1967 | Sullivan | 252/321 |
| 3,408,306 | 10/1968 | Boylan | 252/358 |
| 3,671,235 | 6/1972 | Yamaguchi et al. | 252/321 |
| 3,853,989 | 12/1974 | Conn et al. | 252/321 |
| 3,856,701 | 12/1974 | Householder | 252/358 |
| 3,959,175 | 5/1976 | Smith, Jr. et al. | 252/358 |
| 4,068,024 | 1/1978 | Laufer | 106/288 B |
| 4,198,267 | 4/1980 | Flaherty | 252/358 |

FOREIGN PATENT DOCUMENTS 49-27751  7/1974  Japan .................................. 252/358

*Primary Examiner*—Allan Lieberman
*Attorney, Agent, or Firm*—Merchant, Gould, Smith, Edell, Welter & Schmidt

[57] ABSTRACT

Particulate silica or silicate made hydrophobic by heat treatment to form a reaction product with a hydrophobic alcohol, process for its preparation, and its use in defoaming compositions.

16 Claims, No Drawings

HYDROPHOBIC SILICA OR SILICATE, COMPOSITIONS CONTAINING THE SAME AND METHODS FOR MAKING AND USING THE SAME

TECHNICAL FIELD

This invention relates to SiO$_2$-based defoaming compositions and methods for making and using them, wherein the SiO$_2$ is preferably in the form of a relatively pure silica such as precipitated silica. An aspect of this invention relates to a substantially hydrophobic, particulate, porous or agglomerated silica or silicate containing at least about 40 mole-% SiO$_2$ as silica or silicate, the hydrophobic particulate silica or silicate being derived from a relatively hydrophilic material and rendered hydrophobic by a chemical treatment. Still another aspect of this invention relates to a composition wherein the substantially hydrophobic silica or silicate is distributed uniformly through a liquid carrier such as a liquid hydrocarbon. Still another aspect of this invention relates to a method for chemically treating the relatively hydrophilic silica or silicate to make it substantially hydrophobic. A still further aspect of this invention relates to methods for defoaming of various foam-containing products, by-products, waste or recyclable liquors or materials, and the like.

PRIOR ART

For well over three decades, tiny particles of silica or relatively high-silica silicates have been used for foam inhibition in aqueous foaming systems. Typically, these silicas or silicates have been treated to make them hydrophobic, perhaps the most common treating agent being a silicone (organically substituted polysiloxane) oil. The exact reasons for the effectiveness of the treated siliceous materials in aqueous foaming systems have not been fully or finally settled, but the scientific literature contains a considerable amount of theorizing on this subject. It was first believed that the spontaneous spreading of silicone oil over the bubble surface is primarily responsible for bubble rupture and that the presence of the silica filler increases the spreading pressure and improves dispersibility of silicone oil. However, Povich in AICHE J., 21:1016 (1975) was able to show that the silica filler, if anything, slightly lowers the spreading pressure of silicone oil on aqueous solutions. In 1977, Kulkarni et al (Ind. Eng. Chem. Fundam., 16:472) contended that: "(1) Silicone oil alone in most cases does not act as a foam inhibitor in aqueous foaming systems. (2) The combination silicone oil/hydrophilic silica . . . at normally used ratios . . . is ineffective as an antifoam unless it is heat treated at 150° C. for ca. 2 h. Under these conditions the silicone oil presumably reacts with the silica surface. (3) A mixture of silicone oil and hydrophobic fine silica is effective as an antifoam even without heat treatment. (4) Hydrophobic fine silica alone is ineffective as a foam inhibitor, but is capable of defoaming aqueous foams."

Kulkarni et al conclude that both the hydrophobic fine silica and the silicone oil are necessary for foam inhibition in aqueous foaming systems. This conclusion is rationalized as follows. First, the hydrophobic silica is believed to be a foam breaker, i.e. the fine particles of hydrophobic silica help to rupture foam bubbles. Second, the silicone oil is essentially a carrier fluid which protects the filler particles and brings them into contact with the foam bubble surfaces.

The action of the hydrophobic silica particles as a foam breaker is apparently dependent to a considerable degree upon their hydrophobic character. Higher degrees of hydrophobicity, according to Kulkarni et al, increase the foam-breaking potency of the silica particle and also assist in the dispersion of the particle in the oily carrier. The role of hydrophobic silica particles during the defoaming process was independently recognized by Ross et al, Abstracts of Papers 51st Colloid and Surface Science Symposium, Grand Island, N.Y., June, 1977.

The manufacture of hydrophobic silica and silicates has become an art in itself, and dozens of patents have issued regarding various aspects of this art. New combinations of materials have been investigated, and useful substitutes have been found for both the polysiloxane oil carrier and the polysiloxane treating agent. For example, hydrophobic silica particles have been suspended in liquid hydrocarbon solvents by subjecting the hydrocarbon/silica mixture to high shear. Instead of using a silicone to render the particles themselves hydrophobic, other treating agents such as organosilicon halides have been suggested. Still another suggestion involves preparing a mixture of finely divided silica particles and at least one hydrocarbon that can be oxidized by oxygen at elevated temperatures, heating the resulting mixture at temperatures of from about 140° C. to about 300° C., and contacting the heated mixture with gaseous oxygen. See, for example, U.S. Pat. No. 3,591,519 (Boylan), issued July 6, 1971. In another patent to Boylan, U.S. Pat. No. 3,408,306, issued Oct. 29, 1968, methyl chlorosilane vapors and long chain amines are suggested as hydrophobicity-imparting agents for the silica.

Multi-component mixtures of hydrophobic silica with other materials have been suggested; for example, U.S. Pat. No. 3,959,176 (Mahn et al), issued May 25, 1976 discloses a solid non-foaming dispersing composition containing a poly(oxyethylene/oxypropylene) block copolymer in combination with a hydrophobic silica and an organic spreading liquid.

Not all defoaming compositions, of course, contain hydrophobic silica or silicates. A vast amount of prior art disclosure is concerned with various combinations of organic chemicals or surface active agents which have defoaming properties in the absence of any filler-like component. In many major industries, however, hydrophobic silica- or silicate-containing compositions are still the defoaming agents of choice. In the pulping and repulping of fibrous materials for the manufacture of waterlaid sheets such as paper, roofing felt, and the like, severe foaming problems can be encountered at several stages in the manufacturing process, particularly when natural organic materials having foaming properties are present and/or when the fibrous mass is subject to strong agitation. Uncontrolled foaming can lead to decreased production, lower quality waterlaid sheet products, and other undesirable results. Foaming can also be encountered during bleaching, deinking of broke or recycled pulp, cooking, washing, and draining operations, and the like. Various waste materials or waste or recyclable liquors (such as black liquor) can contain considerable amounts of foam and may require the addition of a defoamer.

Although the hydrophobic silica compositions which contain polysiloxane in one form or another may be highly efficient in spreading and bubble-rupture effects, it has been reported that pulp treated with silicone-derived defoamers results in paper stock which does not take up printing ink uniformly. This undesirable effect is believed to be due to some defoamer residue being carried over to the paper and interfering with printing ink uptake. Even if this were not the case, it would be economically advantageous to eliminate polysiloxanes entirely from the defoaming composition.

SUMMARY OF THE INVENTION

It has now been found that hydrophilic siliceous minerals containing a significant amount of $SiO_2$ as silica or silicate can be made hydrophobic with hydrophobic alcohols which do not appear to have the drawbacks of the organopolysiloxanes. The hydrophilic starting material used in this invention can be one of the conventional particulate, porous or agglomerated silicas or silicates containing at least about 40 mole-% $SiO_2$ as silica or silicate (to insure sufficient surface hydroxyl or silanol content), and this hydrophilic material is mixed with the hydrophobic aliphatic primary or secondary alcohol and heated in admixture to a temperature above 100° C. until the reactants interact to form the reaction product, which is a substantially hydrophobic, particulate, porous or agglomerated silica or silicate comprising porous or agglomerated particles larger than 0.1 micrometers but small enough to be substantially non-settling when uniformly distributed (suspended or dispersed) in a suitable carrier medium. It is preferred that the ratio of hydrophilic silica to hydrophobic alcohol in the reaction mixture range from about 0.25:1 to about 20:1, more preferably about 5 to about 15:1.

In the preferred practice of this invention, the substantially hydrophobic silica or silicate is obtained from the relatively hydrophilic silica or silicate by a method comprising the steps of:

(a) blending a particulate, porous or agglomerated silica or silicate containing at least 40 mole-% $SiO_2$ as silica or silicate with a substantially hydrophobic aliphatic primary or secondary alcohol in a silica or silica/hydrophobic alcohol weight ratio ranging from about 0.25:1 to about 20:1, (b) heating the resulting mixture in a non-aqueous liquid carrier under non-oxidizing conditions at a temperature above 100° C. but below the boiling point of the liquid carrier for a period of time sufficient to cause the silica or silicate to chemically react with the substantially hydrophobic alcohol, and (c) milling the resulting porous or agglomerated particulate reaction product to better distribute it through the liquid carrier and to reduce the particle size of the particulate reaction product, so that the particles will be substantially non-settling. A typical average particle size for non-settling particles is less than 150 micrometers.

The resulting defoaming composition can be used in a number of defoaming applications, including control of foam in paper making, repulping, deinking, waterlaid sheet manufacture generally, defoaming of black liquor and white liquor and other waste or recyclable liquors or materials, in food processing (e.g. in beet sugar refining), waste treatment, and other situations where foaming causes processing problems.

DETAILED DESCRIPTION

Although the substantially hydrophobic siliceous materials of this invention have utility as dry, particulate masses and in aqueous suspensions or dispersions, these materials are typically more effective (at least in some of the more common uses) when generally uniformly distributed through a substantially nonpolar liquid carrier, e.g. a liquid hydrocarbon or hydrocarbon derivative. This generally uniform distribution can be by dispersion or suspension, with or without the presence of agents to slow down or prevent settling of the hydrophobic siliceous particles. The liquid carrier can also provide an excellent medium for the two-phase, heterogeneous reaction system in which the hydrophobic silica or silicate is made. This system comprises the hydrophilic siliceous starting material (the solid, particulate phase) and the substantially hydrophobic alcohol, which is typically sufficiently compatible with the liquid carrier to form a single carrier-alcohol phase. After the alcohol/silica or silicate reaction is completed, the liquid carrier is typically cooled and thickened in order to stabilize the suspension or dispersion of hydrophobic particles, but the resulting suspension or dispersion is still fluid and capable of being easily poured, pumped, stirred, etc. at normal ambient temperatures.

The structure of the substantially hydrophobic silica or silicate has not been determined with certainty. It is known from the literature that particulate siliceous materials having significant surface hydroxylation or surface silanol content can react chemically with various compounds, including compounds such as alcohols which have an active hydrogen atom. There is some evidence indicating that a silanol group can react with an alkanol with elimination of water to form a silyl alkoxy ether-type of structure. It is also well established that alcohols can form hydrogen bonds with silanol groups. Although the presence of ether-like linkages in reaction products of this invention has not been clearly established, these reaction products appear to be more stable than hydrogen-bonded materials. Furthermore, the available evidence indicates that reaction products of this invention cannot be formed at room temperature or even at moderately elevated temperatures (e.g. temperatures below 100° C.). Under normal ambient conditions, heating to at least 150° C. is preferred in order to form the reaction products of this invention in a reasonable period of time. Even at 150° C., heating for a few hours or more is typically desirable to insure that the product has been formed.

Before explaining other aspects of the process for making compositions of this invention, the hydrophilic siliceous material, the substantially hydrophobic alcohol, and the liquid carrier will be described in greater detail.

THE HYDROPHILIC SILICEOUS STARTING MATERIAL

Silicas and silicates useful in this invention are generally characterized by either a porous or agglomerated particulate structure having an extraordinarily large surface area per unit weight. This large surface area factor appears to be present in most of the silicas and silicates used to make prior art hydrophobic siliceous deaerating or defoaming agents also. According to this prior art, there are at least two ways to obtain a hydrophilic siliceous starting material which can provide the high surface area desired for the hydrophobic product. One way is to select a siliceous particulate material which has an extremely small "ultimate" particle size. These very tiny particles, typically colloidal in size, tend to form agglomerates which are typically larger than the "ultimate" particles by from about one to about four orders of magnitude, typically by at least two orders of magnitude. After the hydrophilic particles have been made hydrophobic, still larger agglomerates may be formed. Since these agglomerates are made up of a multitude of much smaller particles, they tend to have a very high surface area.

Another way of obtaining this high surface area is to select an expanded mineral such as perlite. U.S. Pat. No. 3,661,793 (Curtis), issued May 9, 1972, for example, discloses a hydrophobic perlite made from the normally hydrophilic starting material. Non-agglomerated perlite particles are available in much larger particle sizes are compared to, for example, precipitated silica. Because it is an expanded rock, the perlite nevertheless provides a large amount of surface area. In the aforementioned Curtis patent, hydrophobic perlite is disclosed in combinations with other materials (including a water-insoluble hydrophobic organic liquid of the type which would be suitable as a carrier liquid in this invention), which combinations may optionally include hydrophobic silica. Thus, hydrophilic silica and silicate starting materials of this invention typically have a surface area in excess of 20 square meters per gram ($m^2/g$), more typically above 50 $m^2/g$. Surface areas as high as 700 or even 800 $m^2/g$ have been reported in the patent literature. Preferred hydrophilic silica starting materials used in this invention are reported to have a surface area in excess of 200 $m^2/g$. The surface area of hydrophilic silica is typically measured by the nitrogen adsorption method of Brunauer et al, J. Am. Chem. Soc. 60:309 (1938).

When the hydrophilic siliceous starting material is an expanded particulate rock such as perlite, the particle size of this starting material will generally be within the range of 1-1,000 micrometers, preferably less than 100 micrometers. If the particulate starting material is an agglomerate, the average size of the agglomerated particles will typically be within the range of 0.1-100 micrometers, preferably less than 20 micrometers. These rather small agglomerates are made up of still finer particles, typically ranging in average particle size from 0.005 to 0.050 micrometers. After carrying out the chemical reaction between the substantially hydrophobic alcohol and the hydrophilic agglomerates, the original agglomerates are further enlarged and agglomerated to relatively large particles which can have an average particle size well above 100 micrometers. These relatively large agglomerates are useful in this invention; however, it is ordinarily preferred to mill them in a colloid mill so that the average size is reduced to the 1-150 micrometer range, most preferably 20-80 micrometers in average agglomerate size. The milling helps to distribute the enlarged agglomerates more uniformly through the carrier liquid and also helps to maintain the particles in a suspended state. The "ultimate" particle size of these agglomerates can be considered to be constant throughout the process, only the size of the agglomerates being subject to change. This "ultimate" particle size (e.g. the 0.005-0.050 micrometer range discussed previously) tends to be determined by the method of preparing the hydrophilic silica or silicate. For example, silica aerogels and xerogels tend to produce an "ultimate" particle of one size range, fumed silica tends to be of a finer particle size range, and precipitated silica still a third size range.

Since the chemical bonding of the substantially hydrophobic alcohol to the siliceous starting material is believed to involve surface hydroxyl or silanol groups, it is generally preferred that at least a minimum of surface hydroxylation be present on the hydrophilic particles, e.g. more than 0.1 silanol groups per square nanometer. Surface hydroxyl levels approaching 10 silanol groups per square nanometer have been disclosed in the patent literature, and 6-8 SiOH groups per square nanometer is not at all unusual. Theoretically, there is no upper limit on the degree of surface hydroxylation, except as may be dictated by the inherent limitations of the particle structure and its internal and surface chemistry. If a substantial portion of the hydrophilic mineral is not silica, this will of course reduce the level of available silanol groups, although analogous hydroxyl-containing surface groups may be present. The mineral bentonite has been disclosed as a starting material for a hydrophobic silicate. Bentonite is a montmorillonite and can be considered to contain MgO, CaO, and $Al_2O_3$ in addition to $SiO_2$. In addition, the hydrous form of this mineral contains water of hydration. There is (at least after dehydration) a major amount of $SiO_2$ in this mineral, both on a mole-percent and a weight-percent basis. Similarly, perlite is reported to contain 10-20% $Al_2O_3$, 2-5% water, and 65-75% $SiO_2$. Vermiculite, another mineral capable of being expanded in a manner analagous to perlite, is reported to contain more than 40 mole-% of $SiO_2$, even if the presence of water of hydration is taken into account.

The preferred hydrophilic siliceous starting material is precipitated silica, a relatively pure form of silica containing more than 95 wt.-% $SiO_2$. Other forms of finely divided silica are operative in the invention, albeit with less effectiveness than precipitated silica.

Synthetic amorphous silicas are manufactured in various ways. "Aerogel" silicas are obtained by forming a silica hydrogel by polymerization of an alkali metal silicate solution and then washing the hydrogel by means which avoid shrinkage of the gel, e.g. by the steam micronizing process. The aerogel product generally has a pore diameter in excess of about 10 nanometers and a surface area in excess of about 200 $m^2/g$, although typically not much larger than 350 $m^2/g$. The particles of aerogel are agglomerates typically averaging less than 10 micrometers in size. The "ultimate" particles which make up these agglomerates are usually colloidal in size and are smaller than the agglomerates by at least one and in many cases two or three orders of magnitude.

Typical examples of silica aerogels include "SYLOID 244FP" and "SYLOID 266FP" (trademarks of W. R. Grace & Co.), each of which is characterized by a surface area of 310 $m^2/g$ and an average particle size in the range of 2 to 3 micrometers. These commercially available aerogel silicas contain in excess of 99% $SiO_2$ and less than 0.1% each of alumina, titania, calcium oxide, sodium oxide, magnesium oxide, other oxides, and metals or metalloids. The amorphous nature of both the aerogels and the xerogels has been established by X-ray studies, electron micrographs, and the like. The particles of these silica gels have substantial surface hydroxylation.

The process for making a silica xerogel is similar to that for the aerogel, except that the initial hydrogel is slowly washed and dried, typically at a pH near 4. During the slow washing and drying step, a strong shrinkage of the network-like hydrogel structure occurs, resulting in a smaller average pore diameter and a larger surface area. The surface area of "SYLOID 63FP" (trademark of W. R. Grace & Co.), for example, is reported to be 675 $m^2/g$. The average particle size of xerogel agglomerates may be slightly larger than in the case of the aerogels, but is still about the same order of magnitude, e.g. approaching 10 micrometers. The "ultimate" particle size is also similar to that of the aerogels.

"Fumed" silica is normally made by hydrolyzing silicon tetrahalide vapor in a flame of hydrogen and oxygen, producing smoke which consists essentially of colloidal silica particles. The "ultimate" size of these particles is normally even smaller than in the case of precipitated, aerogel, and xerogel silicas, but fumed silica is also capable of agglomeration. In the combustion/hydrolysis process, molten spheres of silica are formed. The diameters of the silica spheres tend to run about 5 to about 15 nanometers in diameter. These molten spheres collide and fuse with one another to form branched, three-dimensional, chain-like aggregates. As the aggregates cool below the fusion temperature of silica, further collisions result in some reversible mechanical entanglement or agglomeration. Further agglomeration can also take place during the collection of these agglomerated particles. The surface area of fumed silica is comparable to the precipitated and gel forms of silica and can exceed 200 m$^2$/g. The fumed agglomerates have one disadvantage, however: there is generally less surface hydroxylation as compared to precipitated silica. Although this invention is not bound by any theory, it is presently believed that the silanol groups on the surface of the silica or silicate (or other available surface hydroxyls) react with the substantially hydrophobic alcohol at elevated temperatures to form a stable chemical bond which is not broken under the conditions typically prevailing during the use of hydrophobic silicas and silicates. Accordingly, it is believed that, the greater the surface hydroxylation, the greater the number of bonds to the hydrophobic alcohol residue which will be formed.

"Precipitated" silica is prepared by destabilization of water-soluble silica (e.g. an alkali metal silicate) under conditions that do not permit formation of a gel structure, but rather cause the flocculation of silica particles into coherent aggregates. Both "ultimate" and agglomerate particle sizes of precipitated silica are similar to other forms of silica such as the aerogels. For example, "ultimate" particle sizes can range from about 5 to about 50 nanometers, the average "ultimate" particle size typically being well below 50 nanometers, e.g. 20 nanometers or less. The agglomerate particle sizes can range from 0.1 to 100 micrometers prior to the chemical interaction with the substantially hydrophobic alcohol. After this reaction, further agglomeration can occur, but, as explained previously, these larger agglomerates are sufficiently loosely bound together to be milled into much smaller fragments, thereby restoring or approaching the original agglomerate size. The defoaming or deaerating performance of hydrophobic silicas of this invention can show marked improvement when the average agglomerate size is reduced from 150 micrometers down to 20–80 micrometers. Further improvement may be observed in the 30–60 micrometer size range, but typically no further improvement is shown when the average size is reduced below 20 micrometers, and some loss of performance may even be observed in the 1–15 micrometer average size range. The surface area of precipitated silicas normally exceeds 200 m$^2$/g and may approach 400 m$^2$/g or more. The chemical composition of the agglomerates comprises high purity $SiO_2$, typically above 95% silica. As noted previously, the surface hydroxyl content is high and will normally exceed one OH per square nanometer and may approach 10 OH groups per sq. nm.

One commercially available form of precipitated silica is sold under the trademark "QUSO" (Philadelphia Quartz Company of Philadelphia, PA, USA). These precipitated silicas sold under the "QUSO" mark have various additional designations such as G30, G32, F22, F20, H40, etc.

There are a number of commercially available "QUSO" silicas which differ in their thickening effect upon aqueous and nonaqueous media. These differences in viscosity-increasing effects are not critical in the context of this invention, since all of these available precipitated silicas are reported to have high surface area, low free moisture content, a high density of surface hydroxyl groups per square nanometer, and the ability to combine with alcohols at elevated temperatures. According to QUSO ® literature, heating at elevated temperatures such as 200° C. for 1 to 4 hours causes hydrogen bonded water repellents to chemically react with the "QUSO" surface. This property is highly significant in this invention.

An example of a suitable precipitated silica is "QUSO G30" (trademark of Philadelphia Quartz Company). This precipitated silica has been used to make hydrophobic silica; see, for example, U.S. Pat. No. 4,123,383 (Ihde), issued Oct. 31, 1978. Hydrophilic "QUSO G30" silica is reported to have a pH of 8.5, a surface area of 300 m$^2$/g, and, like other "QUSO" silicas, a fully hydroxylated surface (about 8 hydroxyls per square nanometer) and an average "ultimate" particle size of 12 nanometers. It is said to contain more than 97% $SiO_2$ on a dry basis.

The agglomerates formed by precipitated silica particles can be subdivided, e.g. through the use of a colloid mill or other forms of milling. If the agglomerates were ever broken down to the "ultimate" particle size of the precipitated silica particles, the particles would be in the colloidal range, e.g. about 5 to about 50 nanometers in average diameter. However, this degree of subdivision is neither necessary nor desirable; a high degree of agglomeration helps to provide the high surface area and porosity characteristics of the material. As noted previously, the step of interacting with the hydrophobic alcohol in a carrier liquid tends to produce even larger agglomerates which have defoaming properties but may settle too quickly from suspension in a carrier liquid. Intermediate-sized and small agglomerates (e.g. minus 60 U.S. mesh, preferably >50 wt.-% minus 100 U.S. mesh) are less likely to settle in this manner.

THE SUBSTANTIALLY HYDROPHOBIC ALCOHOL

Although alcohols containing hydrophilic substituents (such as oxyethylene groups) can, when suitably reacted with the hydrophilic silica, have deaeration or foam control effects, the clear preference of this invention is for alcohols substantially free of any hydrophilic groups or repeating units or substituents. Even the poly(oxyalkylene) diols and mono-ols free of oxyethylene units, e.g. the poly(oxypropylene) glycols appear to have no advantages over the monomeric aliphatic alcohols. The surprising effectiveness of the long-chain aliphatic alcohols is presently a fortunate circumstance, since these alcohols are readily available and do not require any polymerization or other complex synthesis steps to raise their molecular weight to a level which will insure a sufficient amount of hydrophobic character. Straight- and branched-chain higher aliphatic primary and secondary alcohols are among the most readily available hydrophobic alcohol starting materials which can be used in this invention. Alcohols containing 20 or more carbon atoms are of particular interest, since they are a by-product of synthetic alcohol manufacture; they are normally considered less desirable than the $C_8-C_{18}$ alcohols for surfactant manufacture and hence are available at reasonable prices, particularly as compared to more highly sophisticated hydrophobic materials such as the polysiloxanes. In the context of this invention, it has been found that there is no apparent disadvantage to the $C_{20}$ (or higher) alcohols as compared to their supposedly more desirable lower analogs.

Lower aliphatic alcohols generally lack sufficient hydrophobic character to be used in this invention. For example, 1-hexanol is slightly soluble in water, and hexylene glycol is even more water soluble. Even 1-heptanol and 2-heptanol have some hydrophilic character. The octanols, in and of themselves, have been used successfully to provide some defoaming effects, as have the $C_{10}$ to $C_{18}$ alcohols. With respect to the $C_{20}$ and higher alcohols, commercially available "$C_{20}$" and "$C_{22}$" alcohols are often mixtures containing $C_{24}$, $C_{26}$, $C_{28}$, and still higher alcohol species, the $C_{30}$ and higher alcohols being present in the alcohol mixture in very minor amounts (e.g. less than 10% by weight). Availability may diminish above $C_{30}$, but higher alcohols (e.g. $C_{36}$, $C_{40}$, etc.) are known. In the context of this invention, defoaming performance appears to improve slightly with increasing aliphatic alcohol chain length, at least up to about $C_{28}$. There appears to be no major technical advantage to an alcohol "cut" averaging higher than 28 carbons in chain length.

Although both branched-chain and linear aliphatic alcohols are commercially available, the linear or straight-chain type appear to provide a better technical performance with substantially no accompanying economic disadvantage. The saturated aliphatic alcohols (the alkanols) and the aliphatic alcohols of low unsaturation (e.g. up to three double bonds per molecule) generally offer economic advantages and are very effective from a technical standpoint. Primary alcohols are preferred for ease of reactivity with surface-hydroxylated silicas and silicates; however, the secondary alcohols are by no means inert toward such surface-hydroxylated materials.

Long-chain, linear secondary alcohols are known, an example being "TERGITOL 15-S" (trademark of Union Carbide Corporation). The linear secondary alcohols are said to be prepared from linear paraffins and separated by a molecular sieve process from the kerosene fraction of petroleum.

In short, the most preferred substantially hydrophobic alcohols have at least 8 carbon atoms; are generally saturated compounds, typically monomeric in structure (i.e. free of repeating units other than —$CR_2$—, wherein R is hydrogen or alkyl); and typically contain a secondary or, more preferably, a primary OH.

Hydrophobic alcohols used in this invention appear to have the ability to form hydrogen bonds or otherwise enter to reactions with surface-hydroxylated silicas and silicates at normal ambient temperatures and relatively modest temperatures ranging up to about 100° or 110° C. However, these relatively reversible reactions, be they "physical" or "chemical" do not provide the level of defoaming or deaerating performance desired in the context of this invention. At higher temperatures, preferably at least 150°, a different chemical reaction appears to occur, which reaction is presumably not reversible at normal ambient or moderate temperatures, e.g. temperatures below 100° C. This degree of chemical bond stability is important with respect to some of the uses of this invention, wherein the hydrophobic silica or silicate defoamer is called upon to provide deaeration of aqueous systems which inherently are likely to reach temperatures approaching the boiling point of water, e.g. 50°–95° C. Although this invention is not bound by any theory, it is believed that at least some dehydration- or condensation-type reactions can occur in the range of 110°–250° C., particularly at temperatures above 150° C. It is further believed that the resulting, relatively high-strength chemical bonds do a far better job of imparting hydrophobicity to the silica or silicate agglomerates than does hydrogen bonding or similar relatively low-strength bonds.

Regardless of the type of hydrophobic alcohol used in this invention, the silica/alcohol ratio appears to have an effect upon the defoaming or deaerating performance of the siliceous hydrophobic product. Accordingly, all silica/alcohol ratios do not work with equal effectiveness, even though an extremely wide range is at least operative, e.g. 1:4 to 20:1 silica/alcohol on a weight/weight basis. It is generally preferred that the amount of silica exceed the amount of alcohol on a weight basis, but there appears to be no technical advantage in using more than 20 parts silica per part of alcohol. The optimum weight/weight ratio appears to lie somewhere between 5:1 and 15:1 and in most cases is above 7:1 but below 13:1. Neither the hydrophilic silicate alone nor the hydrophobic alcohol alone appears to have much defoaming or deaerating efficiency as compared to the combination which has been reacted at elevated temperatures. But the combination reacted at moderate temperatures below 100° C. also lacks defoaming or deaerating efficiency. It presently appears that the behavior of the hydrophobic alcohols used in this invention is unique and not analogous to closely related compounds such as the long-chain aliphatic amines and carboxylic acids. This evidence is believed to further support the theory that the silanol/alcohol combination produces strong chemical bonds in the reaction temperature range described previously.

THE CARRIER LIQUID

As is known in the art, a hydrophobic liquid carrier or "spreading liquid" can add to the defoaming and deaerating performance of hydrophobic silicas. It is certainly preferred in this invention to make use of such liquid carriers; however, they need not be the expensive silicone oils preferred by some prior art workers in this field. Indeed, the relatively inexpensive hydrocarbon liquids (and their relatively inert derivatives containing minor amounts of other elements such as oxygen, nitrogen, sulphur, or the halogens) are actually preferred because of a lesser tendency to leave residues (in paper and the like) which interfere with printing ink up-take.

Like most hydrocarbons, the preferred liquid carriers of this invention are sufficiently hydrophobic to be water-insoluble. The preferred mineral hydrocarbons are generally classified as paraffinic, naphthenic, or aromatic, depending upon whether they contain aromatic, aliphatic, or cycloaliphatic compounds in proportions which tend to cause the paraffinic, the naphthenic, or the aromatic component to predominate, at least in terms of the characteristics of the liquid. Nonconjugated and non-aromatic unsaturation can be present in the carrier liquid without introduction of an unwarranted degree of hydrophilic character or loss of spreading characteristics. Liquid hydrocarbons having a high vapor pressure at room temperature are not preferred; however, a very slight vapor pressure can be advantageous in that the hydrocarbon residue on the surface of a product such as paper can dissipate with time, leaving only the hydrophobic silica or silicate residue which, by virtue of its having physically interacted with foam or bubbles containing natural or synthetic surface active agents, has become relatively compatible with typical ingredients of paper such as fillers, pigments, and binders.

Defoaming compositions of this invention containing a carrier liquid are likely to be used in aqueous media which may, due to the process in which these media are used or produced, inherently be warm or hot—temperatures approaching 100° C. being fairly typical of some waste liquors and the like. Because the aqueous media to be treated may be rather warm, hydrophobic liquid carriers boiling at temperatures below 100° C. or even below 150° C. are not desirable. Among typical hydrocarbon distillates, the "cuts" above gasoline (e.g. kerosene, mineral oil, and the like) are sufficiently low in volatility to be used in this invention. So-called "process oils" having initial boiling points above 500° or 600° C. are known, and these may be suitable, provided they have suitable viscosity and do not leave a residue which would be undesirable in the context of the normal practice of this invention.

Since the liquid carrier may be subject to temperatures as high as 250° C. during the chemical reaction between the hydrophilic silica or silicate and the hydrophobic alcohol, initial boiling points and boiling ranges in excess of 250° C. are preferred. For example, the typical mineral oil-type distillates boil at temperatures above 300° C. and typically on up to about 400° C. for the highest-boiling constituents.

THE REACTION OF THE HYDROPHILIC STARTING MATERIAL WITH THE SUBSTANTIALLY HYDROPHOBIC ALCOHOL

The hydrophilic silica or silicate is converted into the substantially hydrophobic silica or silicate of this invention by heating a mixture of the hydrophilic material with a suitable substantially hydrophobic alcohol. The mixture is heated to a temperature above 100° C., and preferably to at least 150° C. As in most chemical reactions, there is an interdependency between reaction time and temperature. At 250° C., reaction times are very short, and this can be convenient for large volume manufacture. At 150° C., reaction times are typically much longer and may be as much as 3 or 4 hours or more. It is generally advisable to maintain the elevated temperature conditions for at least 30 minutes and preferably for at least one hour, even at temperatures above 150° C. Reactor design for temperatures in the range of 150°-200° C. is relatively simple, and this equipment factor can help to compensate for relatively longer reaction times. At 190°-210° C., a reaction time of 4 hours is generally sufficient, but longer times are not precluded.

At temperatures above 100° C., most of the preferred hydrophobic alcohols used in this invention are in a liquid state. The hydrophilic silica or silicate solid can theoretically form a heterogenous reaction system with the liquid alcohol, provided the ratio of siliceous solid to liquid or molten alcohol is sufficiently low. The preferred ratios, however, are generally in excess of 1:4 (e.g. 5:1 or more), and it is desirable, if not essential, that the liquid carrier medium be present during the chemical reaction which forms the hydrophobic silica or silicate. The greater efficiency resulting from the liquid carrier in a defoaming composition is a further justification for including a major amount of a material such as a liquid hydrocarbon in the initial reaction mixture. Although this invention is not bound by any theory, it is further believed that the liquid hydrocarbon may help to provide an environment in which side reactions (e.g. oxidation of the alcohol) are less likely to occur. As a further precaution, the mixture of the hydrophilic starting material, the hydrophobic hydrocarbon, and the liquid carrier is heated under non-oxidizing conditions, e.g. in the presence of an inert or relatively inert or non-oxidizing gas or atmosphere such as nitrogen, carbon dioxide, or some other commercially available inert gas. The reaction can be conveniently carried out in a reactor provided with a stirring or agitation means and means for the ingress and egress of the non-oxidizing gas, which helps to flush out moisture and water vapor as well as air. Nitrogen has been found to be effective as the "inert" gas, and it is not necessary to use relatively expensive noble gases such as argon.

After the heating of the reaction mixture has been completed, it is preferable to apply a shearing force to the reaction mixture which contains hydrophobic silica or silicate distributed through the liquid carrier, albeit in rather large agglomerates. After shearing, these large agglomerates are broken down into smaller agglomerates, typically averaging less than 150 micrometers in size and preferably averaging in size within the range of 1-100 micrometers. A suitable means for applying the shear force can be a colloid mill or the like. After milling or shearing, the mixture is cooled to prevent re-formation of the large agglomerates. If the resulting viscosity is sufficiently high, a relatively stable product is obtained. Alternatively, the suspension can be stabilized by adjusting the viscosity with either a thickening agent or a thixotrope or by adding a surfactant stabilizer to prevent or minimize reagglomeration of the suspended particles.

In those cases in which the hydrophilic particles are heated with the alcohol in the absence of the liquid carrier or in a different reaction medium, the resulting hydrophobic silica or silicate can be dispersed in a liquid hydrocarbon carrier with high shear to produce a product which comprises the hydrophobic particles or agglomerates uniformly suspended in the desired liquid carrier. When the preferred reaction media are used, the essential steps of the process of this invention can be carried out at atmospheric or normal ambient pressure. The shearing step, when used, can be carried out at both atmospheric pressure and room temperature.

As noted previously, the elevated temperature conditions above 100° or 110° C. appear to be essential to the formation of the desired chemical bonds between the surface-hydroxylated siliceous material and the substantially hydrophobic alcohol—at least insofar as the completion of these reactions within any reasonable amount of time is concerned. Presently available data indicate that the reactions, if any, between higher alkanols and precipitated silica occurring at temperatures up to 85 or perhaps 100° C. will not produce the hydrophobic silicas of this invention. A very modest degree of success has been obtained with reaction temperatures in the range of 110°–125° C. for 4 hours. But comparison of the product obtained from this degree of heating with a product obtained from a reaction conducted at 200° C. for 4 hours strongly suggests that the 110°–125° C. range requires an excessively long period of time for a complete reaction. The reaction conducted at 200° C. did appear to be complete in 4 hours.

USES OF DEFOAMING AND DEAERATING COMPOSITIONS OF THIS INVENTION

Compositions of this invention can be used in a number of defoaming applications relating to the manufacture of waterlaid sheets, treatment of waste or recyclable liquors, and treatment of other aqueous systems which tend to trap air or form foam. Examples of specific uses include controlling foam in black liquor, in white liquor, in food processing (e.g. beet sugar refining operations), in waste treatment (as in sewage plants), in re-pulping and/or deinking of recyclable paper or other waterlaid sheets, and in treating sulfite liquors.

In the re-pulping of old newspapers, magazines, and other recyclable paper typically having printed matter on it, the recyclable paper is beaten and cooked with an alkaline agent and a surfactant. The ethoxylates of phenolic compounds or other hydrophobic "tails" or capping groups for the oxyethylene chain are typical of the nonionic surface active agents used in a re-pulping process. The deinking and re-pulping are typical of uses of the composition of this invention in at least one respect: the re-pulping or deinking medium is typically at a moderately elevated temperature approaching the boiling point of water, e.g. above 30° C., more typically 50°–80° C. During re-pulping, the object is to remove the inks, wet strength resins, clay, and other agents originally added to the paper and thereby salvage a useful pulp. The raw material for this process is sometimes referred to in the paper industry as "broke".

After cooking, the pulp is separated from the liquor on the screen. This pulp is "washed" as necessary, usually three to five times, with water by resuspending the pulp and draining on the screen for each wash. These steps help to remove soluble as well as insoluble residues from the pulp. During the washing and draining operation, air bubbles from the use of surfactants during the re-pulping or deinking process get trapped in the pulp and hinder the draining of the "wash water". Typically, no additive is included in the "wash water". By adding a defoamer to this "wash water", the bubbles are made to collapse and increase the efficiency of the wash process, particularly the draining steps. With less retention of water through the use of a defoamer, less dissolved solids as well as suspended solids are retained by the pulp.

Other applications of compositions of this invention include the use of defoamers in industrial water curtain-type paint booths, as defoamers in latex paints, and the like. Defoamers and deaerating compositions of this invention do not appear to have a tendency to form heavy particulate residues or deposit build-up in systems such as deinked and re-pulped recyclable paper.

The technique for using a defoaming composition of this invention is ordinarily very simple and generally in accord with prior art practices for treating foaming aqueous systems such as black liquor. A relatively small amount of the defoaming composition can be added directly to the black liquor or other aqueous system. Typically, far less than 1% by weight will be required for significant defoaming, amounts less than 0.1% by weight being typical, even if one includes the weight of the aqueous carrier liquid as part of the defoaming system. (Typically, the hydrophobic silica or silicate, when dispersed or otherwise distributed through a liquid hydrocarbon carrier, constitutes only a minor amount of the total defoaming composition, most typically about 1–30% by weight of the system.)

Prior art defoaming compositions have been used in a manner similar to the compositions of this invention, and prior art disclosures provide background on such uses. See, for example, U.S. Pat. No. 3,180,786 (Domba et al), issued Apr. 27, 1965, U.S. Pat. No. 3,207,698 (Liebling et al), issued Sept. 21, 1965, U.S. Pat. No. 3,408,306 (Boylan et al), issued Oct. 29, 1968, U.S. Pat. No. 3,492,242 (Carney et al), issued Jan. 27, 1970, U.S. Pat. No. 3,501,373 (Ellingworth), issued Mar. 17, 1970, U.S. Pat. No. 4,082,691 (Berger), issued Apr. 4, 1978, and U.S. Pat. No. 4,107,073 (Maciaszek), issued Aug. 15, 1978.

As pointed out in U.S. Pat. No. 3,408,306, defoaming compositions should generally be added in amounts in excess of 1 part per million, but little is to be gained by adding amounts in excess of about 1 part per hundred of the aqueous medium to be treated. Assuming no undesirable residues are formed, however, virtually the only upper limit on the amount which is added is the expense factor.

DEFOAMING EVALUATION

The defoaming efficiency of compositions of this invention and of comparative compositions was determined in all cases in a Glewwe Foam meter which provides a dynamic foam test rather than a static test (as in the case of the Ross-Miles foam test). A dynamic foam meter is considered more appropriate for simulation of industrial conditions, e.g. the conditions in a paper mill. The equipment and general procedure for the Glewwe foam test is described in U.S. Pat. No. 3,899,387, column 12, line 45 et seq. The foam meter itself consists of a thermostated reservoir and a pump to recirculate the aqueous medium with foaming tendencies, e.g. a sample of black liquor. The foam developed by the action of the stream of black liquor impinging on the surface of the black liquor in the reservoir causes foam formation. The foam height above the black liquor is measured after various time intervals and provides a relative measure of the effectiveness of the defoamer added to the black liquor. In all cases, 3,000 ml of the mill black liquor was used and 0.5 ml of the various test defoamers was added to the black liquor. The black liquor was heated to 180° F. (82° C.) and the foam test was conducted at 6 psi (42 kPa) and at the 82° C. temperature to simulate use conditions. The reservoir of this foam meter consists of a stainless steel laboratory beaker of 3,000 ml capacity. Sealed to this beaker by means of a silicone sealant is a clear Plexiglass tubing which snugly fits into the inner walls of the beaker. This enables the operator to measure the foam height above the liquor level. The beaker measures about 19 cm high by about 17 to 18 cm in diameter and the Plexiglass tube extends about 30 to 35 cm above the lip of this beaker. These measurements will indicate that foam levels of 17 to 18 cm will approximately halve the capacity of the black liquor tank in the paper mill. At the other extreme, a foam height of 10 mm or less is relatively insignificant, and a foam height less than 5 mm can be almost disregarded. The degree of agitation taking place in the Glewwe Foam meter is believed to create conditions (albeit on a small or laboratory scale) which may be more severe than those conditions found in a paper mill, particularly in the handling of black liquor. Accordingly, the test results are believed to have a built-in safety factor which helps to insure their relevancy.

OTHER INGREDIENTS IN DEFOAMING COMPOSITIONS

As is known in the art, ingredients such as coloring agents, extenders, surfactants, viscosity control agents, etc. can be added to a hydrophobic silica-containing defoaming composition, particularly when the major amount of the composition (e.g. 70–99% by weight) comprises the liquid carrier.

The principle and practice of this invention is illustrated in the following non-limiting Examples.

The resulting products were not milled. The defoaming evaluation was carried out in the Glewwe Foam Meter earlier described and the foam height was observed after recirculation times of 30 to 300 seconds. The silicone treated silicas are identified as Thompson Hayward "Antifoam 100", dispersed in mineral seal oil. The DF-250 is a product of Mazer Chemical Co. which is reported to contain 7% silicone treated silica and 93% mineral seal oil. The Nopco M-72 is a proprietary silicone treated silica product of the Nopco Chemical Co. The DF-12 is similar to the DF-250 but prepared in the laboratory using Dow Corning silicone fluid Q-2 3011 (2 parts by weight) and "QUSO" silica (5 parts by weight) and heated in mineral seal oil for 3 hours at 100° C.; the product was milled in a colloid mill at 0.005 inch setting.

TABLE 1
EFFECT OF ALCOHOL CHAIN LENGTHS AND SILICA/ALCOHOL (1:4 TO 4:1) RATIOS ON DEFOAMING EFFICACY OF PULP MILL BLACK LIQUOR[2]

| Alfol Alcohol[1] | Gr. Alcohol | Gr. Silica ("QUSO G30") | Ratio SiOH[3] | Grs. Mineral Seal Oil | 30 | 60 | 90 | 120 | 150 | 180 | 210 | 240 | 270 | 300 |
|---|---|---|---|---|---|---|---|---|---|---|---|---|---|---|
| | | | | | \multicolumn{10}{c}{Foam Height in Inches After Recirculation Times in Seconds at 180° F.} |

| Alfol Alcohol[1] | Gr. Alcohol | Gr. Silica ("QUSO G30") | Ratio SiOH[3] | Grs. Mineral Seal Oil | 30 | 60 | 90 | 120 | 150 | 180 | 210 | 240 | 270 | 300 |
|---|---|---|---|---|---|---|---|---|---|---|---|---|---|---|
| 810 | 8.05 | 2.0 | .25 | 89.95 | 0 | 4½ | 6 | 7 | 7½ | 8 | 8¾ | 8¾ | 9½ | 9¾ |
| 810 | 5.0 | 5.0 | 1 | 90.0 | 0 | 0 | ½ | 1½ | 2½ | 4¼ | 4¾ | 5 | 5¼ | 5¾ |
| 810 | 2.0 | 8.0 | 4 | 90.0 | 0 | 0 | 0 | 0 | ¼ | ¾ | 1¾ | 3¼ | 4 | 4 |
| 1014 | 6.67 | 3.33 | .5 | 90.0 | 0 | 0 | 0 | ¾ | 3 | 4½ | 5¼ | 6 | 6¾ | 7 |
| 1014 | 3.40 | 6.67 | 2 | 89.93 | 0 | 0 | 0 | 0 | 0 | ¾ | 4 | 4¾ | 5¼ | 5¾ |
| 1218 | 8.0 | 2.0 | .25 | 90.0 | 0 | 0 | 0 | ½ | 1 | 3¾ | 5 | 5½ | 6 | 6¼ |
| 1218 | 6.69 | 3.33 | .5 | 89.98 | 0 | 0 | ½ | ¾ | ¾ | 1½ | 3¼ | 4 | 4½ | 4¾ |
| 1218 | 5.0 | 5.0 | 1 | 90.0 | 0 | 0 | 0 | 0 | ½ | 1 | 2 | 3½ | 4 | 4¼ |
| 1218 | 2.0 | 8.0 | 4 | 90.0 | 0 | 0 | 0 | 0 | ¼ | 1¼ | 4 | 4½ | 4¾ | 4¾ |
| 1618 | 6.67 | 3.33 | .5 | 90.0 | 0 | 0 | 0 | 0 | ½ | 2 | 3¾ | 4½ | 5 | 5½ |
| 1618 | 3.33 | 6.67 | 2 | 90.0 | 0 | 0 | 0 | ½ | 3 | 4¾ | 4¾ | 5 | 5½ | 5½ |
| 20+ | 8.0 | 2.0 | .25 | 90.0 | 0 | 0 | 0 | 0 | ¼ | 1½ | 5 | 6 | 6¾ | 7 |
| 20+ | 5.0 | 5.0 | 1 | 90.0 | 0 | 0 | 0 | 0 | ¾ | 2¾ | 4¾ | 5 | 5½ | 6 |
| 20+ | 2.0 | 8.0 | 4 | 90.0 | 0 | 0 | 0 | 0 | ¼ | ½ | ½ | 1 | 2 | 4 |
| Thompson Hayward Antifoam | | | | | 1 | 2½ | 4 | 5 | 5½ | 6 | 6 | 6¼ | 6½ | 6¾ |
| DF-250 | | | | | 0 | ¼ | ½ | 3¾ | 4¾ | 5 | 5½ | 5½ | 5¾ | 6 |
| DF-12 | | | | | ¼ | 2½ | 4¼ | 5 | 5½ | 5¾ | 5½ | 6 | 6 | 6 |
| NOPCO M-72 | | | | | ¼ | ¼ | ½ | ¼ | ¾ | 1 | 1¼ | ¾ | 1 | 1¾ |

[1] Alfol Alcohol, Trademark of Conoco Chemical Co.
[2] Dosage: 0.5 ml Defoamer/3000 ml black liquor
[3] Heat treatment for all "ALFOL"/Silica products: 4 hours at 190° C.

EXAMPLE 1

Table 1 is a summary of data on the defoaming performance of the products of this invention compared to several proprietary and one laboratory prepared sample of conventional silica/silicone defoamers. "Alfol" alcohol (primary linear alcohol), a trade name product of Conoco Chemical Company was the source of alcohol. "QUSO G30" (trademark), described previously, was the source of the hydrophilic silica. Different chain length alcohols denoted by 810, 1014, 1218, 1618, and 20+ refer to cuts of alcohol having predominant chain lengths of $C_{8-10}$, $C_{10-14}$, $C_{12-18}$, $C_{16-18}$, and $C_{20+}$, respectively. The ratio of silica to alcohol was varied from 0.25 to 1 to 4 to 1. The alcohol was reacted with silica in a suspension of mineral seal oil for 4 hours at 190° C.

EXAMPLE 2

Table 2 is a summary of the extension of silica to alcohol ratio of the $C_{10-14}$ alcohol (of Table 1) to determine the optimum ratio. In all other respects, this Example followed Example 1. The defoaming test results of this Table and corresponding values for the $C_{10-14}$ alcohol in Table 1 indicates that the silica to alchol ratio of 0.5 may be too low and 18 too high for optimum results for this alcohol. It is to be noted that the "Control" consisting of a heat-treated silica/mineral seal oil mixture did not show any significant foam control. Nine inches (about 23 cm) is approximately the highest foam height which the Glewwe foam tester will accomodate.

TABLE 2
EFFECT OF EXTENDING SILICA/ALCOHOL RATIOS (17:1 TO 7:1) ON $C_{10-14}$ ALCOHOL[1] ON DEFOAMING EFFICACY OF PULP MILL BLACK LIQUOR

| Amount of $C_{10}$–$C_{14}$ Alcohol, g. | Amount of Silica ("QUSO G30"), g. | Ratio Si/OH[3] | Grs. Mineral Seal Oil | 30 | 60 | 90 | 120 | 150 | 180 | 210 | 240 | 270 | 300 |
|---|---|---|---|---|---|---|---|---|---|---|---|---|---|
| | | | | \multicolumn{10}{c}{Foam Height in Inches After Recirculation Times in Seconds[2]} |
| 0.65 | 8.75 | 13 | 90.60 | 0 | 0 | ¼ | ¼ | ¼ | ¾ | ¾ | 1¼ | 1¾ | 2¼ |
| 1.25 | 8.75 | 7 | 90.00 | 0 | 0 | 0 | ¼ | ¼ | ¾ | ¾ | 1 | 1½ | 2½ |
| 0.65 | 12.0 | 18 | 87.35 | 0 | 0 | ¼ | ¾ | 1¼ | 2 | 4 | 4¾ | 5¾ | 6¾ |
| 1.25 | 12.0 | 9.6 | 86.75 | 0 | 0 | 0 | 0 | ¼ | ½ | ¾ | 1 | 2 | 2¼ |

TABLE 2-continued
EFFECT OF EXTENDING SILICA/ALCOHOL RATIOS (17:1 TO 7:1) ON $C_{10-14}$ ALCOHOL[1] ON DEFOAMING EFFICACY OF PULP MILL BLACK LIQUOR

| Amount of $C_{10}$-$C_{14}$ Alcohol, g. | Amount of Silica ("QUSO G30"), g. | Ratio Si/OH[3] | Grs. Mineral Seal Oil | Foam Height in Inches After Recirculation Times in Seconds[2] | | | | | | | | | |
|---|---|---|---|---|---|---|---|---|---|---|---|---|---|
| | | | | 30 | 60 | 90 | 120 | 150 | 180 | 210 | 240 | 270 | 300 |
| Control | 10.0 | | 90.0 | 3¾ | 5¼ | 6¼ | 8½ | 9 | 9 | 9 | 9 | 9 | 9 |

[1]Alfol Alcohol, Trademark of Conoco Chemical Co., $C_{10-14}$ Alcohol.
[2]Dosage: 0.5 ml Defoamer/3000 ml black liquor.
[3]Heat treatment: 4 hours at 190° C.

EXAMPLE 3

Table 3 is a summary of defoaming activity of $C_{10-14}$, $C_{12-18}$ and $C_{20+}$ alcohol treated silica, at silica to alcohol ratios of 8 to 1 and 12 to 1 and wherein the silica is a precipitated silica ("QUSO G30") and fumed silica ("Cab-O-Sil M-5", trademark of the Cabot Corporation). The reaction time and the defoamer tests were the same as for the products in Example 1. Under the conditions of this Example, it appears that there is no significant difference between the use of precipitated silica and fumed silica.

The reacted product was homogenized in a Gifford-Wood, W-Series Colloid Mill. Particle sizes reported are calculated values determined in accordance with the setting of the colloid mill. The product was homogenized for five minutes.

The data of Table 4 suggest that the optimum particle size is in the range from about 30 and 60 micrometers, although the entire range of 5-100 micrometers was considered to exhibit defoaming activity.

TABLE 4
EFFECT OF PARTICLE SIZE ON DEFOAMING EFFICIENCY: SILICA TREATED WITH $C_{12-18}$ ALCOHOL; SILICA/ALCOHOL RATIO = 0.5/1.0

| Amount of $C_{12-18}$ Alcohol, g. | Amount of Silica, g. ("QUSO G30") | Ratio SiOH | Micrometers | Foam Height in Inches After Recirculation Time in Seconds at 180° F. | | | | | | | | | |
|---|---|---|---|---|---|---|---|---|---|---|---|---|---|
| | | | | 30 | 60 | 90 | 120 | 150 | 180 | 210 | 240 | 270 | 300 |
| 6.67 | 3.33 | .5 | 100 | 0 | 0 | ½ | 1¼ | 4 | 5 | 5¼ | 5¼ | 5¾ | 6 |
| 6.67 | 3.33 | .5 | 75 | 0 | 0 | ½ | 1¼ | 3¾ | 4¼ | 4¼ | 4¾ | 4¾ | 5 |
| 6.67 | 3.33 | .5 | 50 | 0 | 0 | 0 | ½ | 1 | 2¾ | 4 | 4¾ | 5 | 5 |
| 6.67 | 3.33 | .5 | 25 | 0 | 0 | 0 | ½ | 1 | 3½ | 4¼ | 4¼ | 4¾ | 5 |
| 6.67 | 3.33 | .5 | 5 | 0 | 0 | ½ | 3 | 4 | 4½ | 4¾ | 5 | 5¼ | 5½ |

EXAMPLE 5

Silica/alcohol ratio verification studies were con-

TABLE 3
EFFECT OF HYDROPHILIC SILICA SOURCE CHAIN LENGTH OF ALCOHOL AND SILICA/ALCOHOL RATIOS ON DEFOAMING EFFICACY OF PULP MILL BLACK LIQUOR

| Alfol Alcohol | Amount of Silica, g. | Amount of Alcohol, g. | Ratio Si/OH | Gr. Mineral Seal Oil | Foam Height in Inches After Recirculation Times in Seconds | | | | | | | | | |
|---|---|---|---|---|---|---|---|---|---|---|---|---|---|---|
| | | | | | 30 | 60 | 90 | 120 | 150 | 180 | 210 | 240 | 270 | 300 |
| 1014 | 8.89* | 1.11 | 8 | 90.00 | 0 | 0 | 0 | ¼ | ½ | ½ | ¾ | 1 | 2½ | 4¼ |
| 1014 | 9.23* | 0.77 | 12** | 90.00 | I 0 | 0 | ¼ | ½ | ½ | ¾ | 1¼ | 3 | 5 | 6 |
| | | | | | II 0 | 0 | 0 | ¼ | ½ | 1¼ | 4 | 5¼ | 6¼ | 6¾ |
| 1014 | 8.89≠ | 1.11 | 8 | 90.00 | 0 | 0 | 0 | ¼ | ½ | ½ | 1 | 1¾ | 4 | 5 |
| 1014 | 9.23≠ | 0.77 | 12 | 90.00 | 0 | 0 | 0 | 0 | ½ | 1 | 1¾ | 4 | 5 | 6 |
| 1218 | 8.89* | 1.11 | 8 | 90.00 | 0 | 0 | ¼ | ½ | ¾ | 1¾ | 4 | 5 | 5¾ | 6¾ |
| 1218 | 9.23* | 0.77 | 12** | 90.00 | I 0 | 0 | ¼ | ½ | ½ | 1¼ | 3 | 4 | 5 | 6 |
| | | | | | II 0 | 0 | ¼ | ½ | 1 | 1 | 1½ | 3¾ | 4¼ | 4¾ |
| 1218 | 8.89≠ | 1.11 | 8 | 90.00 | 0 | 0 | ¼ | ½ | ½ | ¾ | 1 | 1¼ | 2¼ | 4¼ |
| 1218 | 9.23≠ | 0.77 | 12 | 90.00 | 0 | 0 | ¼ | ½ | ½ | ¾ | 1¼ | 1¾ | 3½ | 5 |
| 20+ | 8.89* | 1.59 | 8 | 89.52 | 0 | 0 | 0 | ¼ | ¾ | 1¼ | 3¼ | 4¾ | 5¾ | 6¼ |
| 20+ | 9.23* | 1.10 | 12** | 89.67 | I 0 | 0 | ¼ | ½ | ½ | ¾ | 1 | 1½ | 1¾ | 4 |
| | | | | | II | 0 | ¼ | ½ | ¾ | 1 | 1½ | 3¾ | 4½ | 5¼ |
| 20+ | 8.89≠ | 1.59 | 8 | 89.52 | 0 | 0 | 0 | ¼ | ½ | ¾ | ¾ | 1 | 1½ | 4 |
| 20+ | 9.23≠ | 1.10 | 12 | 89.67 | 0 | 0 | ¼ | ¼ | ¾ | 1 | 1¾ | 3¼ | 5¼ | 6 |

*"Cab-O-Sil M-5" (trademark for fumed silica)
≠"QUSO G30" (trademark of precipitated silica)
**I and II are repeats

EXAMPLE 4

In this Example, the effect of shear (particle size) on the reaction product of alcohol and silica in mineral seal oil was determined wherein the ratio of alcohol to silica was 0.5 to 1 and $C_{12-18}$ alcohol was used. The reaction conditions and the defoaming test were carried out in the same manner as for the results reported in Example 1.

ducted with the $C_{20+}$ alcohol at silica to alcohol weight ratios of 7 to 1, 8 to 1, 9 to 1, and 10 to 1. The reaction time and conditions of defoamer tests were the same as for the products of Example 1. The data in Table 5 indicate that, while the silica-to-alcohol ratio for this alcohol and the precipitated silica is optimal at about 9 to 1, the entire 7:1-10:1 range of ratios appeared to be satisfactory.

TABLE 5
REPEAT, RATIO VERIFICATION OF $C_{20+}$ ALCOHOL/SILICA ON DEFOAMING EFFICIENCY

| Amount of $C_{20+}$ Alfol Alcohol, g. | Amount of "QUSO G30", g. | Ratio Si/OH | Foam Height in Inches After Recirculation Time in Seconds | | | | | | | | | |
|---|---|---|---|---|---|---|---|---|---|---|---|---|
| | | | 30 | 60 | 90 | 120 | 150 | 180 | 210 | 240 | 270 | 300 |
| 1.78 | 8.75 | 7 | 0 | 0 | 1/4 | 1/4 | 1/2 | 3/4 | 3/4 | 3/4 | 1 | 1 |
| 1.59 | 8.89 | 8 | 0 | 0 | 1/4 | 1/4 | 1/2 | 3/4 | 3/4 | 1 | 1 | 1 1/4 |
| 1.43 | 9.00 | 9 | 0 | 0 | 0 | 0 | 0 | 0 | 0 | 1/4 | 1/4 | 1/4 |
| 1.30 | 9.10 | 10 | 0 | 0 | 0 | 1/4 | 1/4 | 1/4 | 1/4 | 1/2 | 1/2 | 3/4 |

EXAMPLE 6

In this Example summarized in Table 6, the effect of temperature of reaction, for reaction time of four hours, on the defoaming properties were determined. Using the $C_{20+}$ alcohol, the precipitated silica and silica to alcohol ratio of 9 to 1, it will be seen that better defoaming results were obtained at a reaction temperature of 200° C. than at 70°–85° C. or 110°–125° C. The sample reacted at 200° C. further contained toluene during the reaction in an attempt to remove water from the reacting mixture as an azeotrope, using a reflux/water trap arrangement as in a conventional toluene/water reflux system for determining water contents for analytical determination. The toluene was removed from the product after the termination of the reaction. A different sample of black liquor was used in this test as the original supply of the black liquor was exhausted; this was not expected to affect the relative singificance of the values shown in the Table.

In addition to these three experiments with the $C_{20+}$ simple alcohol, a product identified as "LF-083" was used as an alcohol to be reacted with the silica. LF-083 is a block polymer of ethylene and propylene oxide. It is made by condensing five moles of ethyleneoxide to a linear primary alcohol ("Alfol" alcohol $C_{16-18}$) followed by condensing 13 moles of propylene oxide and is more specifically represented by:

$$R_{16-18}-O(C_2H_4O)_5(C_3H_6O)_{13}H$$

wherein $R_{16-18}$ is a primary alcohol containing $C_{16}$ to $C_{18}$ carbon atoms and the ethyleneoxy and propyleneoxy group are represented by $(C_2H_4O)$ and $(C_3H_6O)$, respectively. The weight ratio of precipitated silica to LF-083 was varied from 0.25 to 1 to 12 to 1. The reaction time/temperature was four hours at 200° C. The best performance was observed with an Si/OH ratio of 0.5:1. For the first 180 seconds, the performance of the "LF-083"/silica product at this Si/OH ratio was inferior to the simple alcohol/silica product which was obtained in the 200° C. reaction.

TABLE 6
EFFECT OF TEMPERATURE OF REACTION ON DEFOAMING EFFICIENCY

| Rx. Temperature °C. | Foam Height in Inches After Recirculation Time in Seconds at 180° F. | | | | | | | | | |
|---|---|---|---|---|---|---|---|---|---|---|
| | 30 | 60 | 90 | 120 | 150 | 180 | 210 | 240 | 270 | 300 |
| 70–85* | 1/4 | 1 | 1 3/4 | 3 | 3 1/2 | 4 | 4 | 4 1/2 | 4 1/2 | 4 1/2 |
| 110–125* | 0 | 1/4 | 1 | 2 | 3 | 3 1/2 | 3 3/4 | 3 3/4 | 4 | 4 1/4 |
| 200* | 0 | 0 | 0 | 1/4 | 1/2 | 1/2 | 1 | 1 | 1 1/4 | 1 1/4 |
| 200** | 0 | 1/2 | 3/4 | 1 | 1 1/4 | 1 1/4 | 1 1/2 | 1 1/2 | 1 1/2 | 1 1/2 |

*Other conditions and materials (for first three runs).
Reaction time: 4 hours
Si/OH ratio: 4:1
"ALFOL" (trademark) alcohol: $C_{20+}$
Amount of alcohol: 1.43 grams
Amount of "QUSO G30" (trademark for precipitated silica): 9 grams
**Reaction time: 4 hours
Si/OH ratio: 0.5:1
Amount of "LF-083": 6.67 g.
Amount of "QUSO G30": 3.33 g.
$C_{20+}$ equivalent ratio: 2:1

EXAMPLE 7

Example 7, Table 7, is a summary of the defoaming properties of the reaction product of precipitated silica and the $C_{20+}$ alcohol at various silica to alcohol ratios from 0 (all alcohol, no silica) to ∞ (all silica, no alcohol.) All reactions were carried out for four hours at 200° C. All alcohol and mineral seal oil and all silica and mineral seal oil showed poor defoaming. The ratio of silica to alcohol of 0.25 and 12 showed some defoaming activity. The optimal ratios for this alcohol and this silica appeared to be in the silica to alcohol ratio of 7 to 10.

TABLE 7
EFFECT OF VARYING SILICA/$C_{20+}$ ALCOHOL RATIO

| Si/OH Ratio | Foam Height in inches after Recirculation Time | | |
|---|---|---|---|
| | 120 sec. | 210 sec. | 300 sec |
| 0 (all alcohol) | 9 1/4 | 9 1/2 | 9 1/2 |
| 0.25 | 0 | 5 | 7 |
| 1 | 0 | 4 3/4 | 6 |
| 4 | 0 | 1/2 | 4 |
| 7 | 1/4 | 3/4 | 1 |
| 8 | 1/4 | 3/4 | 1 1/4 |
| 9 | 0 | 0 | 1/4 |
| 10 | 1/4 | 1/4 | 3/4 |
| 12 | 1/4 | 1 3/4 | 6 |
| ∞ (all silica) | 8 1/2 | 9 | 9 |

In the foregoing Examples, it should be assumed (except where otherwise indicated) that a different sample of black liquor was used in each Example. Some black liquor samples (especially if from different lots) have more foaming tendencies than others, and Example-to-Example comparisons cannot be made with scientific precision. Even with the same lot of black liquor, repetition of test results may yield variations in foam height which are independent of the particular defoamer being tested; see Table 3 of Example 3. However, the results of the foam tests are believed to have sufficient reliability to the conclusions set forth in these Examples.

The ALFOL ® alcohols used in the foregoing Examples are commercially available in various "cuts" (predominant chain lengths) such as $C_8$–$C_{10}$, $C_{10}$–$C_{14}$, etc., and the optimum "cuts" appear to be "ALFOL 20+" and "ALFOL 22+". These "cuts" will now be described in greater detail.

Both the 20+ and 22+ (also 20+ S.P. and 22+ S.P.) ALFOL ® alcohols are mixtures of high molecular weight, linear primary alcohols generally in the $C_{20}$–$C_{28}$ range. They are off-white, nearly odorless waxy solids available in bulk and flake form. The 20+ S.P. and 22+ S.P. mixtures have been subjected to extensive purification at room temperature. They have been used as defoamers for paper, latex, and other aqueous slurries. Typical melting ranges are 45°–54° C. (for 20+ or 20+ S.P.) and 45°–58° C. (for 22+ or 22+ S.P.). Flash points are typically above 190° C. Typical hydroxyl numbers range from 109–143; iodine numbers range from 10–15, and saponification numbers range from 6 to 9. From 65 to 81% by weight of an ALFOL ® mixture is aliphatic alcohol, the impurities being least with the 20+ S.P. ALFOL ® alcohol. Of the aliphatic alcohol portion, (i.e. on the basis of 100% alcohol), the homolog distribution is as follows:

| Homolog | Distribution in Weight Percent | | | |
|---|---|---|---|---|
| | ALFOL ® 20+ | ALFOL ® 20+ S.P. | ALFOL ® 22+ | ALFOL ® 22+ S.P. |
| $C_{18}$ and lower | 2 | 1 | trace | trace |
| $C_{20}$ | 50 | 50 | 5 | 8 |
| $C_{22}$ | 28 | 30 | 50 | 51 |
| $C_{24}$ | 12 | 12 | 26 | 25 |
| $C_{26}$ | 5 | 5 | 8 | 10 |
| $C_{28}$ and higher | 3 | 2 | 8 | 6 |

Thus, all of these "cuts" consist essentially of $C_{20}$–$C_{26}$ or $C_{20}$–$C_{28}$ aliphatic linear primary alcohols.

EXAMPLE 8

In keeping with the foregoing observations regarding the variability of black liquor samples, a number of active hydrogen-containing hydrophobic organic compounds were tested with a particular black liquor sample, and a composition of this invention was included in the test series to provide a standard for comparison. The composition of this invention was made by reacting a $C_{12}$–$C_{15}$ linear, primary liquid alcohol (NEODOL ® 25) with hydrophilic silica ("QUSO G30") at a silica/alcohol ("Si/OH") ratio of 8:1 for 4 hours at 200° C. Also included in the test series were two less preferred embodiments of the invention, a silica-alcohol reaction product (same silica, same reaction time and temperature, same Si/OH ratio) wherein the alcohols had branched carbon chains, i.e. "HENKEL GT-2428" ($C_{24}$–$C_{28}$ branched chain alcohol) and "HENKEL GT-1620" ($C_{16}$–$C_{20}$ branched chain alcohol). Other compounds tested included:

(a) polyoxypropylene glycol, molecular wt. 1000 ("PPG-1000")

(b) $R(OCH_2CH_2)_nOCH_2Ph$, where $R=C_{10}$–$C_{22}$ straight-chain aliphatic, n is 6–30, and Ph is phenyl (see U.S. Pat. No. 3,444,242 to Rue et al, issued May 13, 1969)

(c) The glycol $HO{-}(PO)_a(EO)_b(AO)_c(EO)_d(PO)_eH$, wherein AO is predominantly propyleneoxy, PO is propyleneoxy, and EO is ethyleneoxy; a, b, c, c, and e all being integers large enough to bring the molecular weight to about 3000–5000; e being large enough so that $-(AO)_c$- constitutes about one-third (by weight) of the glycol, the linking hydrophilic chains together constituting about another third (by weight), and the final third being the terminal hydrophobic chains (see U.S. Pat. No. 3,082,172 to Temple et al, issued Mar. 19, 1963, partiuclarly column 2, lines 45–71)

(d) palmitic acid, $CH_3(CH_2)_{14}COOH$ (e) octadecyl amine, $CH_3(CH_2)_{16}CH_2NH_2$.

No attempt was made to optimize Si/OH ratios.

The NEODOL ® and "HENKEL" alcohols were reacted at 8:1 Si/OH ratios based on the experience with ALFOL ® alcohols reported in the previous Examples. The "PPG-1000" glycol (compound [a]) performed well at a 1:1 Si/OH ratio, hence this ratio was used for comparison compounds (b) through (e). All silica/coreactant reactions were conducted for 4 hours at 200° C.

The results are reported in Table 8.

TABLE 8

VARIOUS HYDROPHOBIC COREACTANTS FOR HYDROPHILIC SILICA
(Reaction Time/Temperature 4 hours/200° C.)

| Coreactant of This Invention | Si/OH Ratio* | Foam Height in Inches After Recirculation Time in Seconds at 180° F. | | | | | | | | | |
|---|---|---|---|---|---|---|---|---|---|---|---|
| | | 30 | 60 | 90 | 120 | 150 | 180 | 210 | 240 | 270 | 300 |
| NEODOL ® 25 $C_{12}$–$C_{15}$ linear primary alcohol | 8:1 | 0 | 0 | ¼ | ¾ | 1 | 1¼ | 1¼ | 1½ | 1¾ | 2 | |
| HENKEL GT-1620 $C_{16}$–$C_{20}$ branched alcohol | 8:1 | 0 | ¼ | ½ | ¾ | 1¼ | 1¼ | 1½ | 1¾ | 2 | 2 | |
| HENKEL GT-2428 $C_{24}$–$C_{28}$ branched alcohol | 8:1 | 0 | ¼ | ½ | 1 | 1¼ | 1½ | 1¾ | 2 | 2½ | 3 | |

| Comparison Coreactants | Si/OH Ratios** | Foam Height in Inches After Recirculation Time in Seconds at 180° F. | | | | | | | | | |
|---|---|---|---|---|---|---|---|---|---|---|---|
| | | 30 | 60 | 90 | 120 | 150 | 180 | 210 | 249 | 270 | 300 |

TABLE 8-continued

VARIOUS HYDROPHOBIC COREACTANTS FOR HYDROPHILIC SILICA
(Reaction Time/Temperature 4 hours/200° C.)

| | | | | | | | | | | | |
|---|---|---|---|---|---|---|---|---|---|---|---|
| (a) "PPG-1000" | 1:1 | ¼ | ½ | ¾ | 1 | 1 | 1¼ | 1¼ | 1¼ | 1¼ | 1¼ |
| (b) U.S. Pat. No. 3,444,242 | 1:1 | 1 | 1¼ | 2¾ | 3¼ | 3½ | 3¾ | 4 | 4 | 4¼ | 4¼ |
| (c) U.S. Pat. No. 3,082,172, column 2 | 1:1 | 1 | 1½ | 1¾ | 2 | 2 | 2½ | 2½ | 2¾ | 2¾ | 3 |
| (d) palmitic acid | 1:1 | 1 | 1¼ | 1¼ | 1½ | 1½ | 1½ | 1¾ | 1¾ | 2 | 2¼ |
| (e) octadecyl amine | 1:1 | 1 | 1¼ | 1¼ | 1¼ | 1½ | 1¾ | 1¾ | 2 | 2 | 2¼ |

*1.11 g coreactant + 8.89 g. "QUSO G30" (trademark) silica.
**5 g. "QUSO G-30" (trademark) silica + 5 g. coreactant.

For the first 120 seconds, the performance of the polyoxypropylene glycol was inferior to the more preferred embodiment of the invention; however, the overall performance of this compound indicated that it had some technical promise (but no economic advantages, particularly in view of the 1:1 silica/OH ratio). Compound (b) apparently did not react with the silica, even at 200° C./4 hours, hence it is believed that whatever defoaming occurred was being done by the compound itself, the hydrophilic silica, and the oil carrier. Compounds (c), (d), and (e) were better than (b) but not significantly better, particularly in short-term performance.

What is claimed is:

1. A substantially hydrophobic, particulate, porous or agglomerated silica or silicate containing at least about 40 mole-% $SiO_2$ as silica or silicate, the hydrophobic particulate silica or silicate being the reaction product of the components consisting essentially of:
   (a) a hydrophilic, particulate, porous or agglomerated silica or silicate containing at least about 40 mole-% $SiO_2$ as silica or silicate, the porous or agglomerated particles of which have an average particle size larger than 0.1 micrometers but small enough to be generally nonsettling, and
   (b) a hydrophobic aliphatic primary or secondary alcohol substantially free of hydrophilic groups, said reactants (a) and (b) having been heated together in admixture to a temperature above 100° C. until the reactants interact to form said reaction product wherein the ratio of silica or silicate to alcohol comprises 0.25:1 to 20:1.

2. A product according to claim 1 which is the reaction product of the components consisting essentially of:
   (a) a hydrophilic, particulate, agglomerated silica or silicate having more than 0.1 silanol groups per square nanometer and an average ultimate particle size within the range of about 5 to about 50 nanometers, the agglomerated particles of which have an average particle size, after milling in a colloid mill, within the range of 20-80 micrometers, and
   (b) a primary or secondary higher-aliphatic alcohol.

3. A product according to claim 2 wherein said hydrophilic, particulate, agglomerated silica or silicate comprises more than 95% by weight of precipitated, fumed, aerogel, or xerogel silica having a substantially fully hydroxylated surface and a surface area ranging from 20 to 800 square meters per gram.

4. A product according to claim 2 wherein said higher aliphatic alcohol consists essentially of a generally straight-chain primary alkanol having more than 8 but less than 30 carbon atoms.

5. A product according to claim 2 wherein the weight ratio of reactant (a) to reactant (b) is greater than 0.5 but less than 18.

6. A product according to claim 2 dispersed in a liquid hydrocarbon carrier.

7. A hydrophobic precipitated silica-containing defoaming composition which comprises:
   (a) the reaction product of the components consisting essentially of:
      hydrophilic, agglomerated, precipitated silica having an ultimate particle size in the range of 5 to 50 nanometers, an average number of silanol groups ranging from about 1 to about 10 per square nanometer, and a surface area of at least about 200 $m^2/g$, and
      from about 6 to about 25 parts by weight, per 100 parts by weight of said silica, of a generally hydrophobic straight-chain primary alkanol substantially free of hydrophilic groups having at least 18 carbon atoms wherein the ratio of silica or silicate to alcohol comprises 0.25:1 to 20:1, and
   (b) a liquid hydrocarbon or hydrocarbon derivative having a boiling point above 100° C., said reaction product having been formed by heating in admixture at a temperature of about 150°-250° C. under non-oxidizing conditions for more than 0.5 hour in said liquid hydrocarbon or hydrocarbon derivative and by milling in a colloid mill until the agglomerated particles of said reaction product have an average particle size within the range of about 30-60 micrometers and are generally uniformly distributed through said liquid hydrocarbon or hydrocarbon derivative, thereby obtaining said defoaming composition.

8. A method for making a substantially hydrophobic silica or silicate from a relatively hydrophilic silica or silicate, comprising the steps of:
   (a) blending particulate, porous or agglomerated silica or silicate containing at least 40 mole-% $SiO_2$ as silica or silicate with a substantially hydrophobic primary or secondary higher aliphatic alcohol substantially free of hydrophilic groups in a silica or silica/aliphatic alcohol weight ratio ranging from about 0.25:1 to about 20:1,
   (b) heating the resulting mixture in a non-aqueous liquid carrier under non-oxidizing conditions at a temperature above 100° C. but below the boiling point of the liquid carrier for a period of time sufficient to cause the silica or silicate to chemically react with the aliphatic alcohol.

9. A method according to claim 8 comprising the further step of:

(c) milling the resulting porous or agglomerated particulate reaction product to better distribute it through the liquid carrier and to reduce the particle size of the particulate reaction product, so that the average size of the particles is less than 150 micrometers.

10. A method according to claim 8 wherein the silica or silicate comprises precipitated silica and the higher aliphatic alcohol consists essentially of a primary or secondary aliphatic alcohol having 8–28 carbons.

11. A method according to claim 10 wherein the precipitated silica and said alcohol are combined in a silica/alcohol weight ratio ranging from about 5 to about 15:1.

12. A method according to claim 11 wherein said heating is carried out at about 150°–250° C. for more than 0.5 hour, and the free surface of said liquid carrier is blanketed with a gas generally incapable of oxidizing hydrocarbons and aliphatic compounds at temperatures in the range of 150°–250° C.

13. A liquid defoaming composition comprising the composition produced according to claim 8.

14. A method for deaerating of an agitated, waterlaid sheet-forming pulp comprising the step of adding the substantially hydrophobic, particulate, porous or agglomerated silica or silicate of claim 1 to the pulp.

15. A method according to claim 14 wherein said pulp contains broke and is agitated in a repulping step.

16. A method for deaerating of an organic material-containing, foam-containing liquor from a papermaking process comprising the step of adding the substantially hydrophobic, particulate, porous or agglomerated silica or silicate of claim 1 to the liquor.

* * * * *

UNITED STATES PATENT AND TRADEMARK OFFICE
CERTIFICATE OF CORRECTION

PATENT NO.    : 4,443,357
DATED         : JAMES E. MALONEY AND THOMAS R. OAKES
INVENTOR(S)   : April 17, 1984

It is certified that error appears in the above-identified patent and that said Letters Patent are hereby corrected as shown below:

Column 16, line 6 of Table 1, under heading "180" for "3-3/4"
    read --3/1/2--.
Column 16, line 7 of Table 1, under heading "180", for "1-1/2"
    read --1-1/4--.
Column 22, line 29, for "a, b, c, c," read --a, b, c, d--.
Column 22, line 37, for "partiuclarly" read --particularly--.

Signed and Sealed this

Twenty-sixth Day of March 1985

[SEAL]

Attest:

DONALD J. QUIGG

Attesting Officer

Acting Commissioner of Patents and Trademarks